(12) United States Patent
Ueki

(10) Patent No.: US 10,578,187 B2
(45) Date of Patent: Mar. 3, 2020

(54) VIBRATION ISOLATION DEVICE

(71) Applicant: BRIDGESTONE CORPORATION, Tokyo (JP)

(72) Inventor: Akira Ueki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/302,653

(22) PCT Filed: Mar. 13, 2015

(86) PCT No.: PCT/JP2015/057554
§ 371 (c)(1),
(2) Date: Oct. 7, 2016

(87) PCT Pub. No.: WO2015/163034
PCT Pub. Date: Oct. 29, 2015

(65) Prior Publication Data
US 2017/0023090 A1    Jan. 26, 2017

(30) Foreign Application Priority Data
Apr. 24, 2014  (JP) ................ 2014-090687

(51) Int. Cl.
*F16F 13/10*    (2006.01)
*B60K 5/12*    (2006.01)

(52) U.S. Cl.
CPC .......... *F16F 13/107* (2013.01); *B60K 5/1208* (2013.01); *F16F 13/10* (2013.01)

(58) Field of Classification Search
CPC ........ F16F 1/377; F16F 13/107; F16F 1/3873; B60K 5/04; B60K 5/1208
(Continued)

(56) References Cited

U.S. PATENT DOCUMENTS 1,560,655 A * 11/1925 Brewster ................ B60G 13/04
267/219
4,383,679 A * 5/1983 Kakimoto ............. F16F 13/105
248/562
(Continued)

FOREIGN PATENT DOCUMENTS

EP    0286527 A1 * 10/1988 ............ F16F 13/107
EP    1176335 A1 *  1/2002 ............ F16F 13/107
(Continued)

OTHER PUBLICATIONS

Communication dated May 3, 2017 from the European Patent Office in counterpart application 15782570.4.
(Continued)

*Primary Examiner* — Bradley T King
*Assistant Examiner* — Mahbubr Rashid
(74) *Attorney, Agent, or Firm* — Sughrue Mion, PLLC

(57) ABSTRACT

A vibration isolation device (10) of the present invention includes: a tubular first attachment member (11) coupled to one of a vibration generating part and a vibration receiving part, and a second attachment member (12) coupled to the other thereof; an elastic body (13) which couples both the attachment members together; and a partition member (16) which partitions a liquid chamber in the first attachment member (11) in which a liquid (L) enclosed into a first liquid chamber (14) and a second liquid chamber (15), in which at least one of the first liquid chamber (14) and the second liquid chamber (15) has the elastic body (13) as a portion of a wall surface thereof; and a communication passage (30) which communicates with the first liquid chamber (14) and the second liquid chamber (15), and a barrier rigid body (33) which is disposed in the communication passage (30) are provided in the partition member (16).

5 Claims, 3 Drawing Sheets

(58) Field of Classification Search
USPC .................................................. 267/140.13
See application file for complete search history.

(56) References Cited

U.S. PATENT DOCUMENTS

| | | | | |
|---|---|---|---|---|
| 4,483,521 A | * | 11/1984 | Kakimoto | F16F 13/107 267/140.13 |
| 4,630,808 A | * | 12/1986 | Ushijima | F16F 13/10 267/140.13 |
| 4,651,980 A | * | 3/1987 | Morita | F16F 13/106 267/140.13 |
| 4,676,489 A | * | 6/1987 | Hofmann | F16F 13/107 267/122 |
| 4,709,898 A | * | 12/1987 | Yoshida | F16F 13/107 248/636 |
| 4,739,962 A | * | 4/1988 | Morita | F16F 9/34 267/140.13 |
| 4,739,978 A | * | 4/1988 | Bodin | F16F 13/107 188/320 |
| 4,795,140 A | * | 1/1989 | Orikawa | F16F 13/24 267/140.13 |
| 4,903,951 A | * | 2/1990 | Miyamoto | F16F 13/103 267/140.13 |
| 5,433,421 A | * | 7/1995 | Ishiyama | F16F 13/107 248/559 |
| 5,645,138 A | * | 7/1997 | Tajima | F16F 13/16 180/300 |
| 6,217,011 B1 | * | 4/2001 | Redinger | F16F 1/38 188/322.21 |
| 6,547,226 B2 | * | 4/2003 | Shores | F16F 13/262 267/140.11 |
| 6,848,682 B2 | * | 2/2005 | Tewani | F16F 13/262 267/140.14 |
| 8,499,907 B2 | * | 8/2013 | Smith | B64C 27/001 188/378 |
| 2004/0089989 A1 | | 5/2004 | Tewani et al. | |
| 2011/0001281 A1 | | 1/2011 | Kanaya et al. | |
| 2014/0232049 A1 | | 8/2014 | Kanaya | |

FOREIGN PATENT DOCUMENTS

| | | |
|---|---|---|
| EP | 2 221 503 A1 | 8/2010 |
| EP | 3 130 818 A1 | 2/2017 |
| GB | 2 154 699 A | 9/1985 |
| JP | 60-184737 A | 9/1985 |
| JP | 61-156749 U | 9/1986 |
| JP | 61-156750 U | 9/1986 |
| JP | 2005-282823 A | 10/2005 |
| JP | 2007-120598 A | 5/2007 |
| JP | 2009-150451 A | 7/2009 |
| JP | 2009236143 A | 10/2009 |
| JP | 2012-26510 A | 2/2012 |
| WO | 2013/114476 A1 | 8/2013 |

OTHER PUBLICATIONS

Communication dated Jan. 9, 2018 from the State Intellectual Property Office of the P.R.C. in counterpart application No. 201580020629.5.

* cited by examiner

VIBRATION ISOLATION DEVICE

CROSS REFERENCE TO RELATED APPLICATIONS

This application is a National Stage of International Application No. PCT/JP2015/057554, filed on Mar. 13, 2015, which claims priority from Japanese Patent Application No. 2014-090687, filed on Apr. 24, 2014, the contents of all of which are incorporated herein by reference in their entirety.

TECHNICAL FIELD

The present invention relates to a vibration isolation device that is applied to automobiles, industrial machines, or the like, for example, and absorbs and damps vibrations of vibration generating parts such as engines.

Priority is claimed on Japanese Patent Application No. 2014-090687, filed Apr. 24, 2014, the content of which is incorporated herein by reference.

BACKGROUND ART

For example, as this type of vibration isolation device, a configuration described in the following Patent Document 1 is known. This vibration isolation device includes a tubular first attachment member which is coupled to one of a vibration generating part and a vibration receiving part, and a second attachment member which is coupled to the other thereof; an elastic body which couples both the attachment members together; and a partition member which partitions a liquid chamber within the first attachment member having a liquid enclosed therein into a first liquid chamber and a second liquid chamber. This vibration isolation device further includes a first limit passage and a second limit passage which allows both the liquid chambers to communicate with each other, a cylinder chamber which is provided between both the liquid chambers, and a plunger member disposed so as to be movable between an open position and a blocking position within the cylinder chamber.

For example, vibrations of a plurality of kinds having frequencies different from each other, such as idle vibrations and shake vibrations, are input to this vibration isolation device. Thus, in this vibration isolation device, the respective resonant frequencies of the first limit passage and the second limit passage are set (tuned) to the respective frequencies of the different kinds of vibration. As the plunger member moves between the open position and the blocking position according to the frequencies of input vibrations, a limit passage through which a liquid flows is switched between the first limit passage and the second limit passage.

CITATION LIST

Patent Document

[Patent Document 1] Japanese Unexamined Patent Application, First Publication No. 2007-120598

SUMMARY OF INVENTION

Technical Problem

However, in the vibration isolation device of the related art, there is room for improvement in simplification of structure and facilitation of manufacture.

In addition, for example, in the vibration isolation device of the related art, when unintended vibrations, such as fine vibrations having higher frequencies and extremely smaller amplitudes than the resonant frequency of a limit passage determined depending on the passage length, the cross-sectional area, or the like of the limit passage, are input, a dynamic spring constant may increase due to clogging of the limit passage, which may influence the product characteristics of the vibration isolation device, such as the driving comfort of automobiles.

The present invention is made in consideration of the above-described circumstances, and an object thereof is to provide a vibration isolation device in which simplification of structure and facilitation of manufacture can be improved while product characteristics can be secured.

Solution to Problem

In order to solve the above-described problems, the present invention suggests the following means.

According to an aspect of the present invention, a vibration isolation device includes: a tubular first attachment member coupled to one of a vibration generating part and a vibration receiving part, and a second attachment member coupled to the other thereof; an elastic body which couples both the attachment members together; and a partition member which partitions a liquid chamber within the first attachment member having a liquid enclosed therein into a first liquid chamber and a second liquid chamber, in which at least one of the first liquid chamber and the second liquid chamber has the elastic body as a portion of a wall surface thereof; and in which a communication passage which communicates with the first liquid chamber and the second liquid chamber, and a barrier rigid body which is disposed in the communication passage are provided in the partition member.

In this invention, when vibrations are input and liquid flows through the communication passage between the first liquid chamber and the second liquid chamber, the liquid collides with the barrier rigid body. In this case, if a flow speed of the liquid is high, the pressure loss of the liquid increases and vibrations are absorbed and damped due to energy loss generated by collision between the liquid and the barrier rigid body, or the like. Meanwhile, if the flow speed of the liquid is low, the pressure loss of the liquid due to the above-described collision is suppressed, the liquid smoothly flows into the communication passage, and an increase in a dynamic spring constant is suppressed.

According to this vibration isolation device, the pressure loss of the liquid increases according to the flow speed of the liquid that flows into the communication passage, and thus, it is possible to absorb and damp vibrations. Therefore, for example, when normal vibrations such as idle vibrations or shake vibrations are input, it is possible to absorb and damp the vibrations regardless of frequencies of the vibrations. Accordingly, occurrence of noise is prevented while vibrations of a plurality of kinds having frequencies different from each other are absorbed and damped, and thus, it is possible to improve simplification of structure and facilitation of manufacture.

In addition, in a state where a flow speed is low and the pressure loss of the liquid is suppressed, the liquid smoothly flows into the communication passage, and an increase in the dynamic spring constant is suppressed. Accordingly, for example, when unintended vibrations such as fine vibrations having higher frequencies and extremely smaller amplitudes than normal vibrations are input, that is, when the flow speed of the liquid is lower than the flow speed when normal vibrations are input, it is possible to suppress an increase in the dynamic spring constant. As a result, it is possible to easily secure the product characteristics of the vibration isolation device.

The barrier rigid body may be disposed on a flow passage axis of the communication passage.

In this case, since the barrier rigid body is disposed on the flow passage axis of the communication passage, a fluid having a relatively higher flow speed in the communication passage in the liquid that flows through the communication passage can collide with the barrier rigid body. Accordingly, it is possible to easily increase the pressure loss of the liquid, and it is possible to effectively absorb and damp vibrations.

A limit passage, which is provided independently from the communication passage and communicates with the first liquid chamber and the second liquid chamber, may be provided in the partition member.

In this case, if the flow speed of the liquid that flows through the communication passage increases when vibrations are input and the pressure loss of the liquid increases, a flow resistance of the liquid that flows through the communication passage increases. As a result, the liquid positively flows through the limit passage between the first liquid chamber and the second liquid chamber in this case since resonance is generated in the limit passage, the input vibrations are further absorbed and damped.

In this way, for example, when normal vibrations are input, it is possible to absorb and damp vibrations by not only the pressure loss of the liquid but also the resonance in the limit passage. Accordingly, it is possible to effectively absorb and damp the vibrations.

Advantageous Effects of Invention

According to the present invention, it is possible to improve simplification of structure and facilitation of manufacture while securing product characteristics.

DESCRIPTION OF EMBODIMENTS

Hereinafter, an embodiment of a vibration isolation device according to the present invention will be described with reference to FIGS. 1 to 3.

Figure 1:
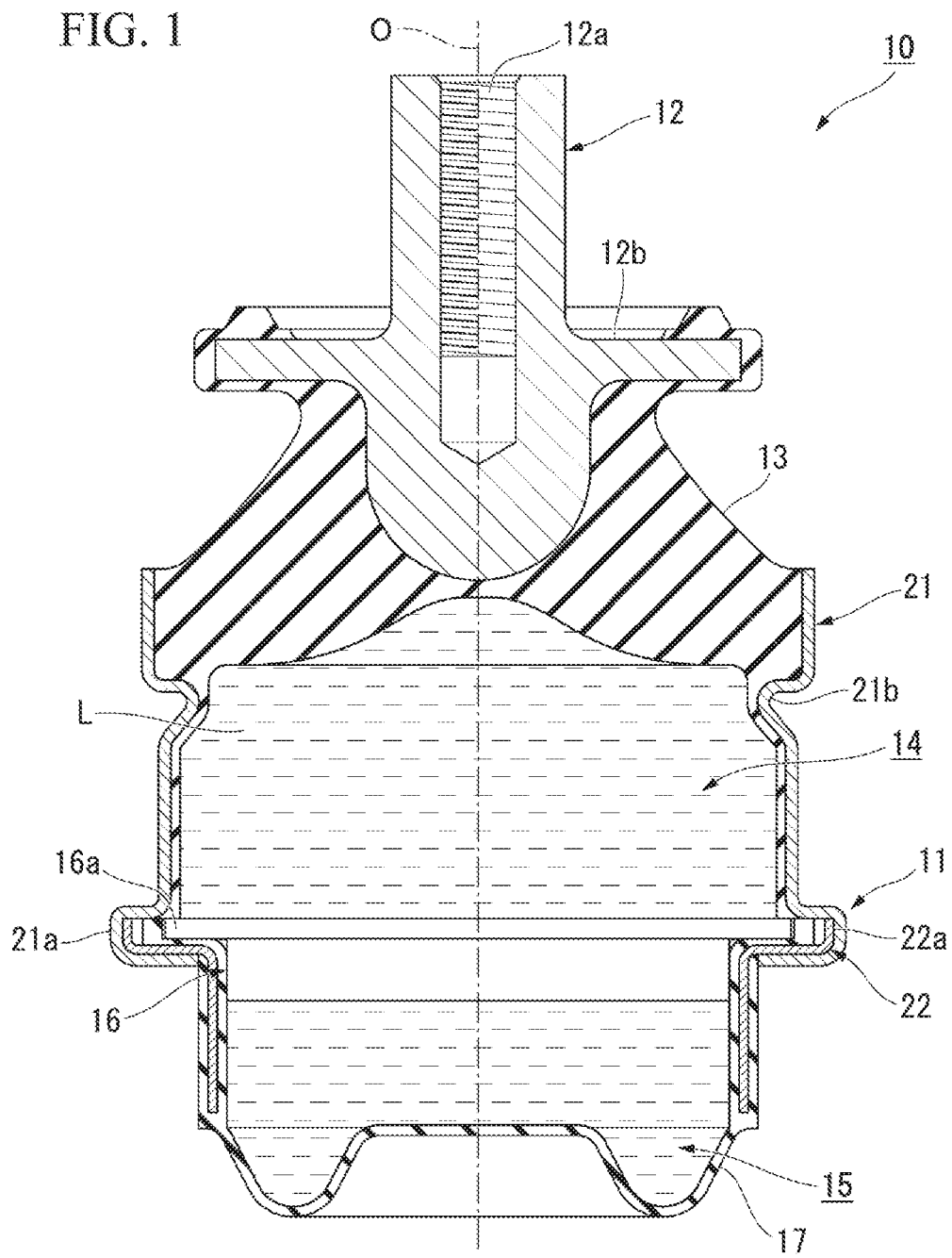
FIG. 1 is a longitudinal sectional view of a vibration isolation device according to a first embodiment of the present invention and is a view when a partition member is viewed from the side surface.

As shown in FIG. 1, a vibration isolation device 10 includes a tubular first attachment member 11 which is coupled to any one of a vibration generating part and a vibration receiving part, a second attachment member 12 which is coupled to the other thereof, an elastic body 13 which couples both the attachment members 11 and 12 together, and a partition member 16 which partitions a liquid chamber within the first attachment member 11 having a liquid L enclosed therein into a main liquid chamber (first liquid chamber) 14 which has the elastic body 13 as a portion of a wall surface thereof and an auxiliary liquid chamber (second liquid chamber) 15.

In the shown example, the second attachment member 12 is formed in a pillar shape, the elastic body 13 is formed in a tubular shape, and the first attachment member 11, the second attachment member 12, and the elastic body 13 are disposed coaxially with a common axis. Hereinafter, this common axis is referred to as an axis (an axis of the first attachment member and an axis of the partition member) main liquid chamber 14 side along a direction (a flow passage axis direction of a communication passage and an axial direction of the partition member) of the axis O is referred to as a first side, the auxiliary liquid chamber 15 side along the direction of the axis O is referred to as a second side, a direction orthogonal to the axis O referred to as a radial direction (a radial direction of the first attachment member and a radial direction of the partition member), and a direction around the axis O is referred to as a circumferential direction (a circumferential direction of the first attachment member and a circumferential direction of the partition member).

In addition, for example, in a case where the vibration isolation device 10 is mounted on an automobile, the second attachment member 12 is coupled to the engine serving as the vibration generating part. Meanwhile, the first attachment member 11 is coupled to a vehicle body serving as the vibration receiving part via a bracket (not shown), and prevents vibrations of the engine from being transmitted to the vehicle body. For example, the vibration isolation device 10 is a liquid-enclosed type, in which the liquid L such as ethylene glycol, water, or silicone oil is enclosed in a liquid chamber of the first attachment member 11.

The first attachment member 11 includes a first-side outer tube body 21 located on first side in the direction of the axis O, and an second-side outer tube body 22 located on the second side in the direction of the axis O.

The elastic body 13 is coupled to a first-side end of the first-side outer tube body 21 in a liquid-tight state. A first-side opening of the first-side outer tube body 21 is blocked by the elastic body 13. The second-side end 21a of the first-side outer tube body 21 is formed with a larger diameter than those of the other portions. The inside of the first-side outer tube body 21 serves as the main liquid chamber 14. When vibrations are input, the elastic body 13 is deformed, the internal volume of the main liquid chamber 14 varies, and thus, the liquid pressure of the main liquid chamber 14 fluctuates.

In addition, an annular groove 21b which continuously extends over the entire circumference of the first-side outer tube body 21 is formed in the portion of the first-side outer tube body 21 which is connected to a portion, to which the elastic body 13 is coupled, from the second side.

A diaphragm 17 is coupled to the second-side end of the second-side outer tube body 22 in a liquid-tight state, and the second-side opening of the second-side outer tube body 22 is blocked by the diaphragm 17. A first-side end 22a of the second-side outer tube body 22 is formed with a larger diameter than those of the other portions, and is fitted into the second-side end 21a of the first-side outer tube body 21. In addition, the partition member 16 is fitted into the second-side outer tube body 22, and the portion inside the second-side outer tube body 22 positioned between the partition member 16 and the diaphragm 17 serves as the auxiliary liquid chamber 15. The auxiliary liquid chamber 15 has the diaphragm 17 as a portion of a wall surface thereof, and is expanded and contracted when the diaphragm 17 is deformed. In addition, the second-side outer tube body 22 is covered over substantially the entire region with a rubber membrane formed integrally with the diaphragm 17.

A female thread part 12a is formed coaxially with the axis O on a first-side end surface of the second attachment member 12. The second attachment member 12 protrudes from the first attachment member 11 to the first side. A flange part 12b that protrudes toward a radial outer side and continuously extends over the entire circumference is formed in the second attachment member 12. The flange part 12b is separated from first-side end edge of the first attachment member 11 to the first side.

For example, the elastic body 13 is formed of a rubber material or the like capable of being elastically deformed, and is formed in a tubular shape that has a gradually enlarged diameter from the first side toward the second side. The first-side end of the elastic body 13 is coupled to the second attachment member 12, and the second-side end thereof is coupled to the first attachment member 11.

In addition, the inner peripheral surface of the first-side outer tube body 21 of the first attachment member 11 is covered over substantially the entire region with the rubber membrane formed integrally with the elastic body 13.

The partition member 16 is formed in a disk shape which is disposed coaxially with the axis O, and is fitted into the first attachment member 11. A flange part 16a that protrudes toward the radial outer side is provided on the partition member 16. The flange part 16a is provided on the first-side end of the partition member 16. The flange part 16a is disposed inside the first-side end 22a of the second-side outer tube body 22.

Communication passages 30 that communicate with the main liquid chamber 14 and the auxiliary liquid chamber 15 are provided on the partition member 16.

A plurality of communication passages 30 are provided on the partition member 16 in the circumferential direction, and penetrate the partition member 16 in the direction of the axis O. The plurality of communication passages 30 are intermittently disposed on the partition member 16 over the entire circumference in the circumferential direction, and the plurality of communication passages 30 are disposed on the same circumference having the axis O as a center and form annular passage rows 31. Multiple passage rows 31 are provided on the partition member 16, that is, each of the plurality of passage rows 31 are provided so as to have different diameters.

Figure 3:
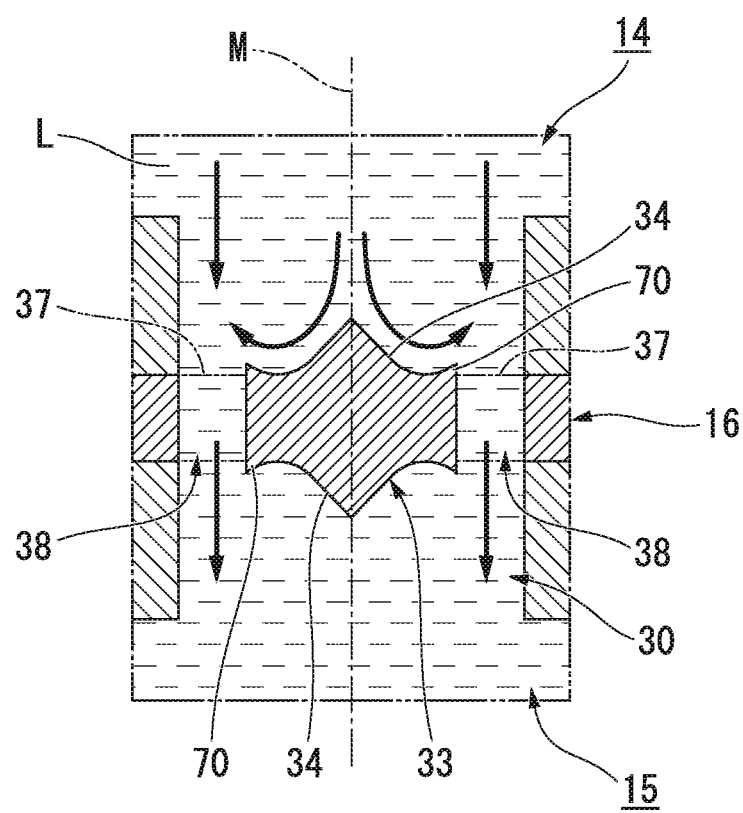
FIG. 3 is a longitudinal sectional showing a main portion of the partition member shown in FIG. 2.

As shown in FIG. 3, each of the communication passages 30 extends in the direction of the axis O, and is opened to each of both end surfaces of the partition member 16 in the direction of the axis O. Each of the communication passages 30 is formed so as to have the diameter over the entire length in the direction of the axis O. The communication passage 30 linearly extends in the direction of the axis O when the partition member 16 is viewed from a longitudinal cross-section in the direction of the axis O, and the communication passage 30 is circularly formed in a plan view when the partition member 16 is viewed in the direction of the axis O. The communication passage 30 is formed in a columnar shape that extends in the direction of the axis O.

Here, barrier rigid bodies 33 are provided inside the communications passages 30. Each of the barrier rigid bodies 33 is provided inside each of the plurality of communication passages 30. For example the barrier rigid body 33 is formed of a resin material or the like, is a rigid body which has rigidity at which the barrier rigid body 33 is not deformed when being subjected to the flow of the liquid L, and is formed integrally with the partition member 16.

In addition, in the present embodiment, each of the barrier rigid bodies 33 branches the flow of the liquid L which flows through the communication passages 30 between the main liquid chamber 14 and the auxiliary liquid chamber 15. Each of the barrier rigid bodies 33 causes the liquid L flowing through each communication passage 30 to flow along the surface of the barrier rigid body 33, and bends the flow of the liquid L.

The barrier rigid body 33 is disposed on a flow passage axis M of the communication passage 30 so as to be separated from the inner peripheral surface of the communication passage 30. The barrier rigid body 33 is formed in a columnar shape that is disposed coaxially with the flow passage axis M. The barrier rigid body 33 is symmetrically formed in the direction of the axis O. An end surface 34 of the barrier rigid body 33 is a spindle-shaped surface that protrudes toward the outer side in the direction of the axis O, and in the shown example, is a conical surface. The barrier rigid body 33 causes the liquid L to flow toward the outer side in the flow passage radial direction that is the radial direction of the communication passage 30 on the end surface 34 of the barrier rigid body 33, and branches the flow of the liquid L.

In addition, in the present embodiment, a return part 70 is provided on the barrier rigid body 33. The return part 70 combines at least a portion of the flow of the liquid L that is branched by the barrier rigid body 33 with the flows of other liquids L flowing along the inner peripheral surface of the communication passage 30 in the communication passage 30. The return part 70 inverts the direction of the flow of the liquid L, which flows toward the outer side in the flow passage radial direction on the barrier rigid body 33, to the direction of the axis O, and combines the flow of the liquid L with the flows of other liquids L.

The return part 70 is provided on the outer peripheral edge part on the end surface 34 of the barrier rigid body 33, and the outer peripheral edge part gradually extends to the outer side in the direction of the axis O from the inner side in the flow passage radial direction toward the outer side. The return part 70 is formed in a concave curved-surface shape which is recessed toward the inner side in the direction of the axis O when the barrier rigid body 33 is viewed from a longitudinal cross-section in the direction of the axis O and the flow passage radial direction. The return part 70 is provided on the entire circumference around the flow passage axis M.

Figure 2:
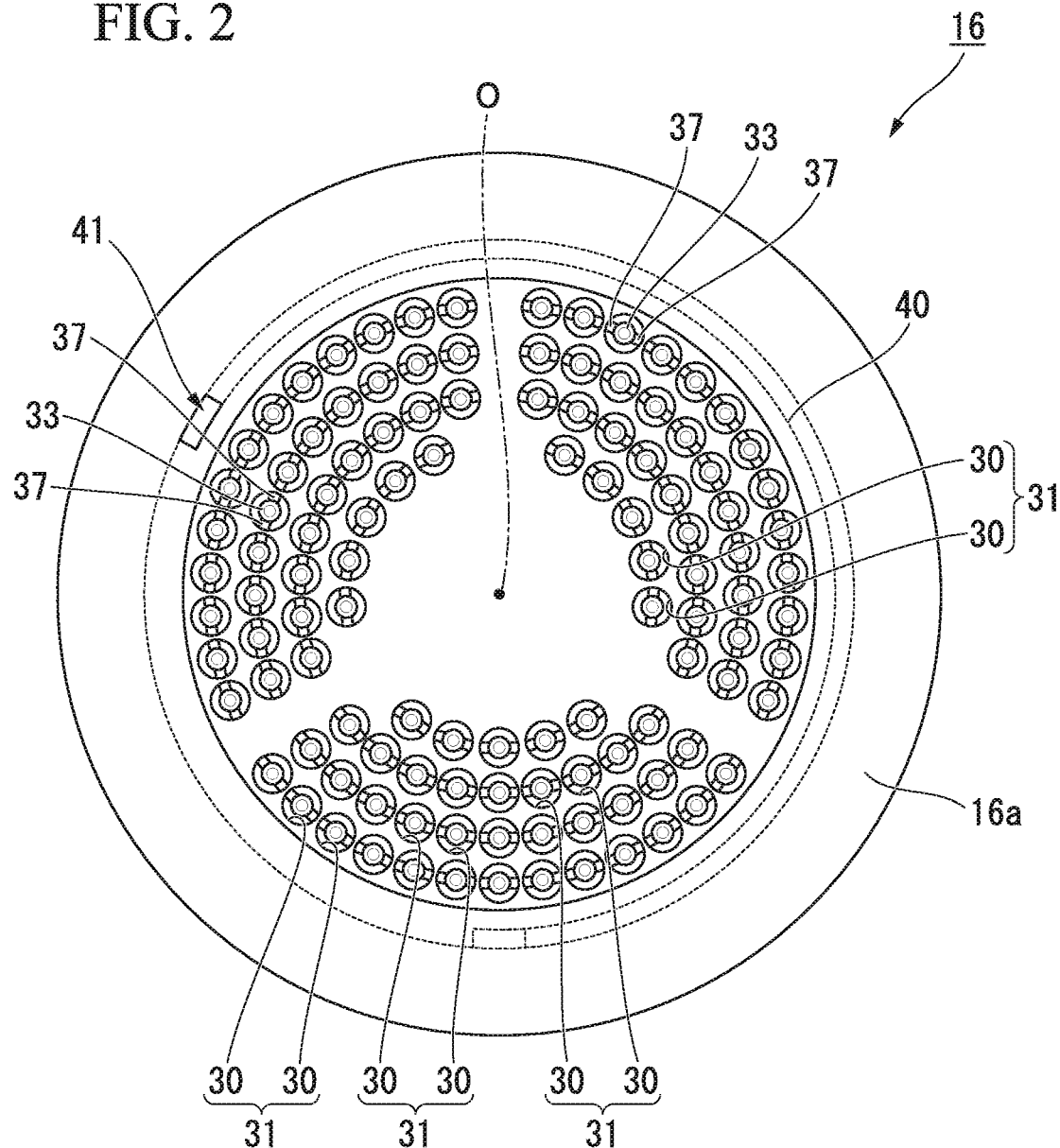
FIG. 2 is a plan view of the partition member that is included in the vibration isolation device shown in FIG. 1.

As shown in FIGS. 2 and 3, the barrier rigid body 33 is coupled to the partition member 16 via bridge parts 37. The bridge parts 37 couple the center part on the outer peripheral surface of the barrier rigid body 33 in the direction of the axis O to the center part on the inner peripheral surface of the communication passage 30 in the direction of the axis O. Each of the bridge parts 37 is formed in a rod shape that extends in the flow passage radial direction, and the pair of bridge parts 37 is disposed such that the flow passage axis M is interposed therebetween in the flow passage radial direction. Portions of the communication passage 30 interposed between the pair of bridge parts 37 around the flow passage axis M are open toward both sides in the direction of the axis O, and thus, passing gaps 38 through which the liquid L passes in the direction of the axis O are provided. A pair of passing gaps 38 are provided between the outer peripheral surface of the barrier rigid body 33 and the inner peripheral surface of the communication passage 30 such that the barrier rigid body 33 is interposed between the pair of passing gaps 38. The barrier rigid body 33 is interposed between the passing gaps 38 in the flow passage radial direction in a plan view.

In addition, as shown in FIG. 2, in the plurality of communication passages 30 which configure the same passage row 31, the bridge parts 37 which are disposed in the communication passages 30 extend along circumferences through which the communication passages 30 pass.

Here, in the present embodiment, a limit passage 41 is further provided in the partition member 16. The limit passage 41 is provided independently from the communication passages 30 in the partition member 16. The limit passage 41 has the same flow passage cross-sectional area over the entire length of the limit passage 41 in the now passage axis direction. The resonant frequency of the limit passage 41 is the same as the frequency of the vibration that is normally input to the vibration isolation device 10, and the limit passage 41 generates resonance (liquid column resonance) with respect to the input of the normal vibration (first vibration). For example, as the normal vibration, there is a shake vibration (for example, frequency is 14 Hz or less and amplitude is more than 0.5 mm), an idle vibration (for example, frequency is 18 Hz to 30 Hz and amplitude is ±0.5 mm or less) which has higher frequency and smaller amplitude than those of the shake vibration, or the like.

The resonant frequency of the limit passage 41 is lower than the resonant frequency of the communication passage 30. For example, the resonant frequency of the communication passage 30 is the same as the frequency of an unintended vibration (second vibration) such as a fine vibration that has a higher frequency and extremely smaller amplitude than those of the above-described normal vibration. For example, the resonant frequency of each of the communication passages 30 and the limit passages 41 is determined based on a passage length, a flow passage cross-sectional area, or the like of each of the communication passages 30 and the limit passages 41.

In addition, the liquid L easily and preferentially flows through the communication passage 30 to the limit passage 41 immediately after the normal vibrations are input to the vibration isolation device 10. For example, this configuration can be realized by adjusting the flow passage length, the flow passage cross-sectional area, or the like of each of the limit passages 41 and the communication passages 30.

Next, an operation of the vibration isolation device 10 will be described.

If a vibration is input from the vibration generating part to the vibration isolation device 10 shown in FIG. 1 in the direction of the axis O, both the attachment members 11 and 12 are displaced relatively to each other while elastically deforming the elastic body 13, and thus, the liquid pressure in the main liquid chamber 14 fluctuates. Accordingly, the liquid L comes and goes between the main liquid chamber 14 and the auxiliary liquid chamber 15 through the communication passages 30. In this case, in the present embodiment, the liquid L preferentially comes and goes through the communication passages 30 to the limit passage 41. If the liquid L inside the main liquid chamber 14 flows toward the auxiliary liquid chamber 15 side through the communication passages 30, as shown in FIG. 3, first, the liquid L flows into the communication passages 30 from first-side ends of the communication passages 30, and collides with the barrier rigid body 33.

Here, for example, normally, vibrations such as idle vibrations or shake vibrations are input to the vibration isolation device 10. Among the vibrations, in the idle vibrations, the frequencies are high while the amplitudes are relatively small, and in the shake vibrations, the amplitudes are great while the frequencies are low. Accordingly, when the normal vibrations are input, the flow speed of the liquid L that flows into the communication passages 30 increases so as to be a predetermined value or more.

In this way, if the flow speed of the liquid L increases, pressure loss of the liquid L increases due to energy loss generated by collision between the liquid L and the barrier rigid body 33 or the like, and the vibrations are absorbed and damped. Moreover, in the present embodiment, since the barrier rigid body 33 is disposed on the flow passage axis M of the communication passage 30, in the liquid L which flows through the communication passages 30, a fluid which flows through the inner side of the communication passage 30 in the flow passage radial direction and has a relatively increased flow speed collides with the barrier rigid body 33.

After the liquid L collides with the barrier rigid body 33, the barrier rigid body 33 branches the flow of the liquid L flowing into the communication passage 30 toward the outer side in the flow passage radial direction. In this case, in the liquid that flows through the communication passages 30, a fluid that flows through the outer side in the communication passage 30 in the flow passage radial direction flows toward the passing gap 38 along the inner peripheral surface of the communication passage 30. Accordingly, the fluid which flows the inner side in the communication passage 30 in the flow passage radial direction flows toward the outer side in the flow passage radial direction on the end surface 34 of the barrier rigid body 33, and if the direction of the flow of the liquid L is inverted to the direction of the axis O by the return part 70, the flow of the liquid L is combined with the flows of other liquids L which flow toward the above-described passing gaps 38. As a result, the pressure loss of the liquid L further increases due to energy loss or the like generated by the collisions between the liquids L having the combined flows.

In addition, if the liquid L inside the auxiliary liquid chamber 15 flows toward the main liquid chamber 14 side through communication passages 30, first, the liquid L flows from the second-side ends of the communication passages 30 into the communication passages 30 and collides with the barrier rigid body 33. In this case, since the flow speed of the liquid L increases, the pressure loss of the liquid L increases due to energy loss generated by collision between the liquid L and the barrier rigid bodies 33 or the like, and the vibrations are absorbed and damped.

After the liquid L collides with the barrier rigid body 33, the barrier rigid body 33 inverts the flow of the fluid flowing through the inner side in the communication passage 30 in the flow passage radial direction in the liquids L which flow into the communication passages 30, and causes the flow of the fluid to collide with the fluid which flows through the outer side in the communication passage 30 in the flow passage radial direction in the liquids L which flow into the communication passages 30. As a result, the pressure loss of the liquid L further increases due to energy loss or the like generated by the collisions between the liquids L.

Here, as described above, if the pressure loss of the liquid L increases, flow resistance of the liquid L through the communication passage 30 increases. As a result, the liquid L positively flows through the limit passage 41 between the main liquid chamber 14 and the auxiliary liquid chamber 15. In this case, since resonance is generated inside the limit passage 41, the input vibrations are further absorbed and damped.

Meanwhile, for example, fine vibrations having higher frequencies and extremely smaller amplitudes than assumed those or the like may be unintentionally input to the vibration isolation device 10. When fine vibrations are input, since the flow speed of the liquid L flows into the communication passages 30 is low, even when the liquid L collides with the barrier rigid body 33 or the liquids L collide with each other, the pressure loss of the liquid L is suppressed. Accordingly, the liquid L passes through the communication passages 30 and smoothly flows between the main liquid chamber 14 and the auxiliary liquid chamber 15, and thus, an increase in a dynamic spring constant is suppressed.

As described above, according to the vibration isolation device 10 of the present embodiment, the pressure loss of the liquid L increases according to the flow speed of the liquid L flowing into the communication passages 30, and thus, it is possible to absorb and damp vibrations. Accordingly, for example, when normal vibrations such as idle vibrations or shake vibrations are input, it is possible to damp vibrations regardless of the frequencies of the vibrations. Accordingly, occurrence of noise is prevented while a plurality of kinds of vibrations having frequencies different from each other are absorbed and damped, and thus, it is possible to improve simplification of structure and facilitation of manufacture.

In addition, for example, when normal vibrations are input, it is possible to absorb and damp vibrations by not only the pressure loss of the liquid L but also the resonance in the limit passage 41. Accordingly, it is possible to effectively absorb and damp the vibrations.

Moreover, in a state where a flow speed is low and the pressure loss of the liquid L is suppressed, the liquid L smoothly flows into the communication passages 30, and an increase in the dynamic spring constant is suppressed. Accordingly, for example, when unintended vibrations such as fine vibrations having higher frequencies and extremely smaller amplitudes than normal vibrations are input, that is, when the flow speed of the liquid L is lower than the flow speed when the normal vibrations are input, it is possible to suppress an increase in the dynamic spring constant. As a result, it is possible to easily secure the product characteristics of the vibration isolation device 10.

In addition, since the barrier rigid body 33 is disposed on then flow passage axis M of the communication passage 30, a fluid having a relatively higher flow speed in the communication passage 30 in the liquids L which flow through the communication passages 30 can collide with the barrier rigid body 33. Accordingly, it is possible to easily increase the pressure loss of the liquid, and it is possible to effectively absorb and damp vibrations.

In addition, since the barrier rigid body 33 is disposed on the flow passage axis M of the communication passage 30, the liquid L that flows into the communication passage 30 flows on the barrier rigid body 33. Accordingly, it is possible to branch the flow of the liquid L toward the outer side in the flow passage radial direction, and it is possible to reliably branch the flow of the liquid L.

In addition, since the return part 70 is provided, the liquids L branched by the barrier rigid body 33 collide with each other, many portions of the liquids L can contribute to energy loss, and it is possible to effectively increase the pressure loss of the liquid L.

In addition, since the return part 70 is provided on the barrier rigid body 33, for example, it is possible to improve simplification of the structure of the vibration isolation device.

Moreover, the return part 70 combines the flow of the liquid L that flows on the barrier rigid body 33 with the flows of other liquids L which flows toward the passing gaps 38 along the inner peripheral surface of the communication passage 30 in the liquid L flowing into the communication passage 30. Therefore, the liquid L which flows along the flow passage axis M in the communication passage 30 and has a relatively high flow speed is branched by the barrier rigid body 33, this liquid L can collide with other liquids L which flow along the inner peripheral surface of the communication passage 30 in the communication passage 30 and have relatively low flow speeds, and thus, it is possible to effectively increase the pressure loss of the liquid L.

In addition, since the plurality of communication passages 30 are provided on the partition member 16 in the circumferential direction and penetrate the partition member 16 in the direction of the axis O, it is possible to easily secure of the flow passage areas of the communication passages 30. Accordingly, when vibrations are input to the vibration isolation device 10 and the flow speed of the liquid L in the communication passages 30 increases, a large amount of liquid L collides in the communication passages 30, it is possible to easily increase the pressure loss of the liquid L and it is possible to effectively absorb and damp vibrations.

Moreover, the plurality of communication passages 30 are provided. Accordingly, even when the communication passages 30 are reduced in a state where the shape of each communication passage 30 is maintained compared to a case where only one communication passage 30 is provided, it is possible to maintain the total of the cross-sectional areas of the plurality of communication passages 30 so as to be the same as the cross-sectional area of the communication passage 30 in the case where only one communication passage 30 is provided. As a result, it is possible to cause the total of the volumes of the plurality of communication passages 30 to be smaller than the volume of the communication passage 30 in the case where only one communication passage 30 is provided. Accordingly, compared to the case where only one communication passage 30 is provided, it is possible to decrease the flow rate of the liquid L required for effectively generating the pressure loss of the liquid L. In addition, particularly, this effect is remarkably exhibited in a case where the number of the communication passages 30 is four or more.

In addition, a technical scope of the present invention is not limited to the embodiment, and various modifications may be applied within the scope that does not depart from the aim of the present invention.

In the present invention, the plurality of communication passages 30 are not provided, and one communication passage 30 may be provided.

In addition, in the above-described embodiment, the main liquid chamber 14 and the auxiliary liquid chamber 15 communicate with each other through the limit passage 41 different from the communication passages 30 in addition to the communication passages 30. However, the present invention is not limited to this. For example, the main liquid chamber and the auxiliary liquid chamber do not communicate with the limit passage, and may communicate with only the communication passages.

In addition, the return part 70 may not be provided.

In addition, in the above-described embodiment, the inside of the limit passage 41 or the inside of the communication passage 30 may be blocked by a membrane which is elastically deformed by the liquid pressure of the liquid L such as an elastic thin film. In this case, since the liquid pressures of the liquids L which are positioned on both sides in a state where the membrane is interposed therebetween are transmitted via the membrane, the liquid L flows to the inside of the limit passage 41 or the inside of the communication passage 30.

In addition, in the above-described embodiment, the partition member 16 partitions the liquid chamber inside the first attachment member 11 into the main liquid chamber 14 which has the elastic body 13 as a portion of the wall surface thereof, and the auxiliary liquid chamber 15. However, the present invention is not limited to this. For example, instead of providing the diaphragm 17, a pair of elastic bodies may be provided in the axial direction, and instead of providing the auxiliary liquid chamber 15, a pressure-receiving liquid chamber that has the elastic body as a portion of the wall surface thereof may be provided. That is, the partition member partitions the liquid chamber inside the first attachment member having the liquid enclosed therein into the first liquid chamber and the second liquid chamber, and at least one of both the liquid chambers such as the first liquid chamber and the second liquid chamber may be appropriately changed to another configuration which has the elastic body as a portion of the wall surface thereof.

In addition, in the above-described embodiment, the case is described in which an engine is connected to the second attachment member 12 and the first attachment member 11 is connected to the vehicle body. However, inversely, an engine may be connected to the first attachment member 11 and the second attachment member 12 may be connected to the vehicle body.

In addition, the vibration isolation device 10 according to the present invention is not limited to an engine mount of a vehicle, and may be applied to a mount different from the engine mount. For example, the present invention may be applied to a mount of a generator which is mounted on a construction machine, or may be applied to a mount of a machine which is installed on factory or the like.

In addition, the constituent elements in the embodiment can be appropriately substituted with well-known constituent elements within the scope that does not depart from the scope of the invention. Additionally, the above-described modifications may be appropriately combined.

INDUSTRIAL APPLICABILITY

According to the vibration isolation device of the present invention, it is possible to improve simplification of structure and facilitation of manufacture while securing product characteristics.

REFERENCE SIGNS LIST

10: vibration isolation device
11: first attachment member
12: second attachment member
13: elastic body
14: main liquid chamber (first liquid chamber)
15: auxiliary liquid chamber (second liquid chamber)
16: partition member
30: communication passage
33: barrier rigid body
41: limit passage
L: liquid

What is claimed is:

1. A vibration isolation device, comprising:
a tubular first attachment member coupled to one of a vibration generating part and a vibration receiving part, and a second attachment member coupled to the other thereof;
an elastic body which couples both the attachment members together; and
a partition member which partitions a liquid chamber within the first attachment member having a liquid enclosed therein into a first liquid chamber and a second liquid chamber,
wherein at least one of the first liquid chamber and the second liquid chamber has the elastic body as a portion of a wall surface thereof,
wherein a communication passage which communicates with the first liquid chamber and the second liquid chamber, and a barrier rigid body which has rigidity such that the barrier rigid body is not deformed when being subjected to the flow of the liquid, is disposed in the communication passage and by which the flow of the liquid which flows through the communication passages is branched toward the outer side in the flow passage radial direction, are provided in the partition member,
wherein the barrier rigid body is formed of the partition member,
wherein the barrier rigid body does not move with respect to the partition member when the barrier rigid body receives a liquid pressure,
wherein passing gaps which are open toward both sides in the direction of a flow passage axis are provided, and
wherein an end surface of the barrier rigid body comprises a conical surface protruding toward an outer side in the flow passage axis.

2. The vibration isolation device according to claim 1, wherein the barrier rigid body is disposed on the flow passage axis of the communication passage.

3. The vibration isolation device according to claim 1, wherein a limit passage, which is provided independently from the communication passage and communicates with the first liquid chamber and the second liquid chamber, is provided in the partition member.

4. The vibration isolation device according to claim 2, wherein a limit passage, which is provided independently from the communication passage and communicates with the first liquid chamber and the second liquid chamber, is provided in the partition member.

5. The vibration isolation device according to claim 1, wherein the barrier rigid body has a shape having two portions which are symmetrical to each other with respect to the flow passage axis.

* * * * *